Feb. 24, 1953     I. B. ROSE     2,629,343
BRUSHING MECHANISM
Filed Aug. 10, 1949     5 Sheets-Sheet 1
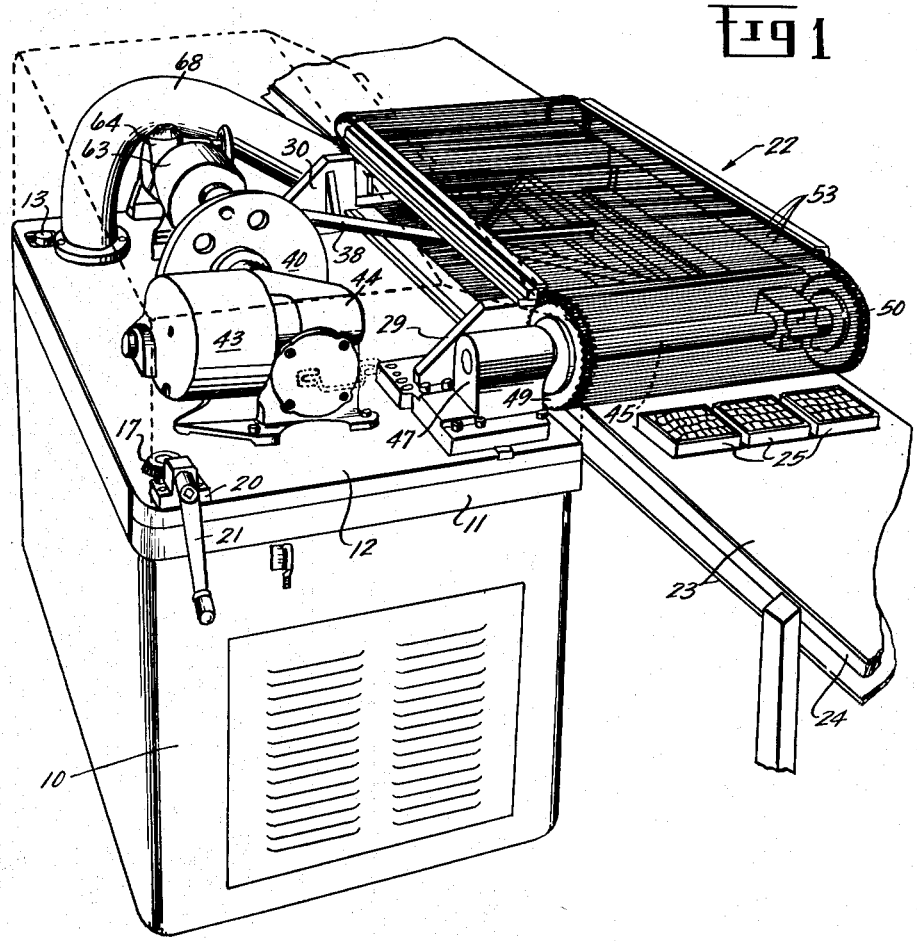
Fig 1
INVENTOR.
IRVIN B. ROSE
BY 
ATTORNEY

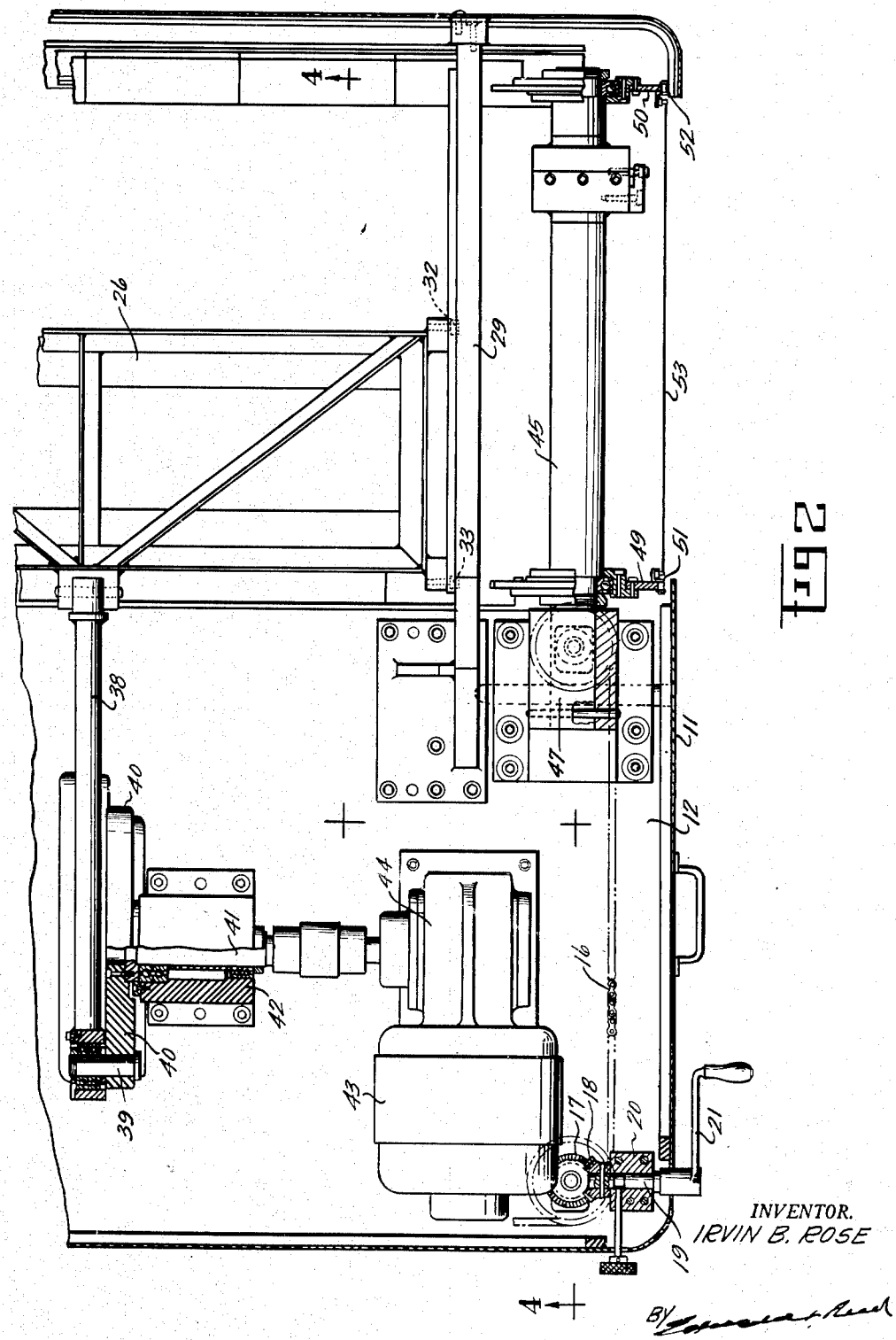

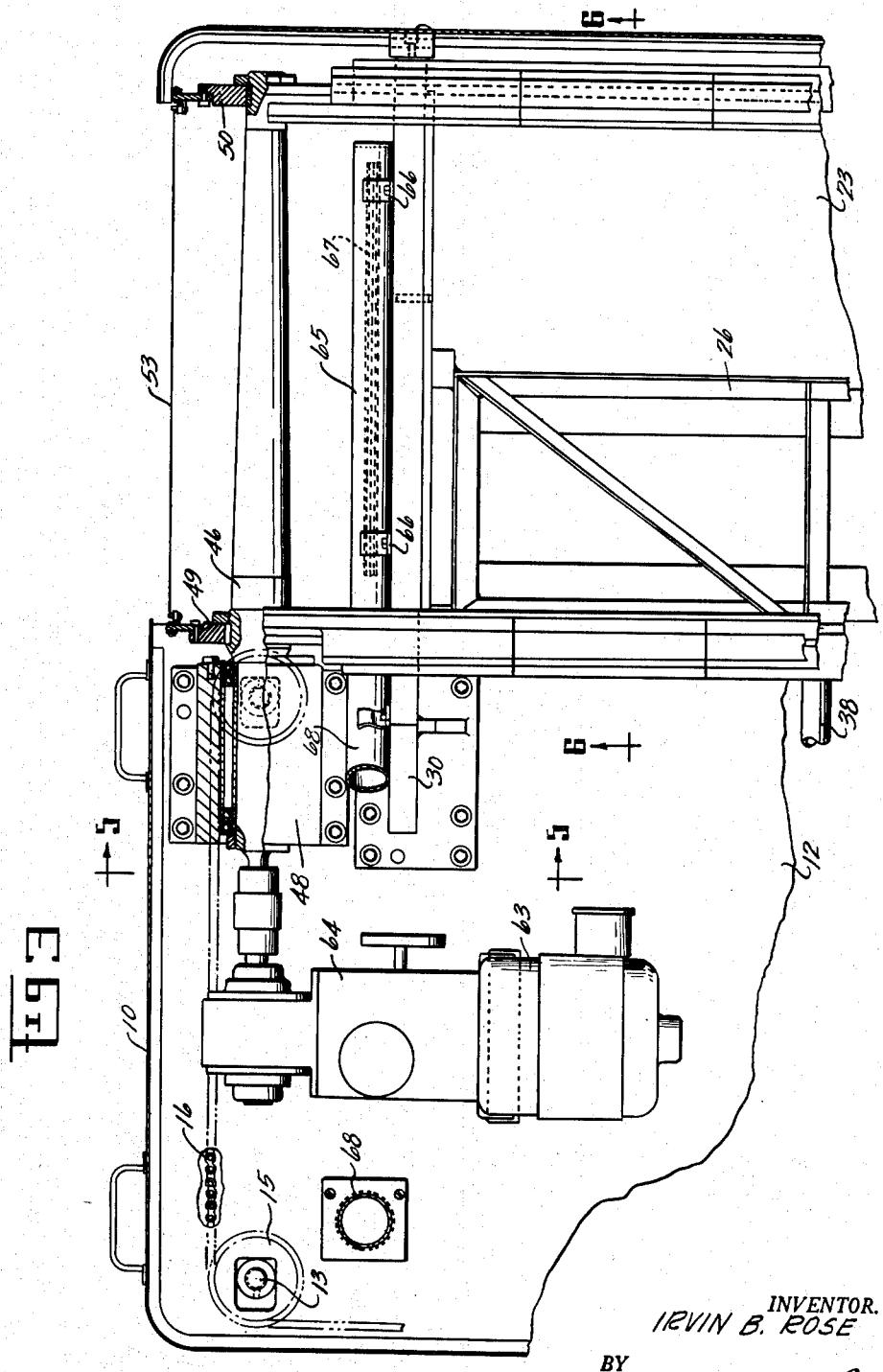

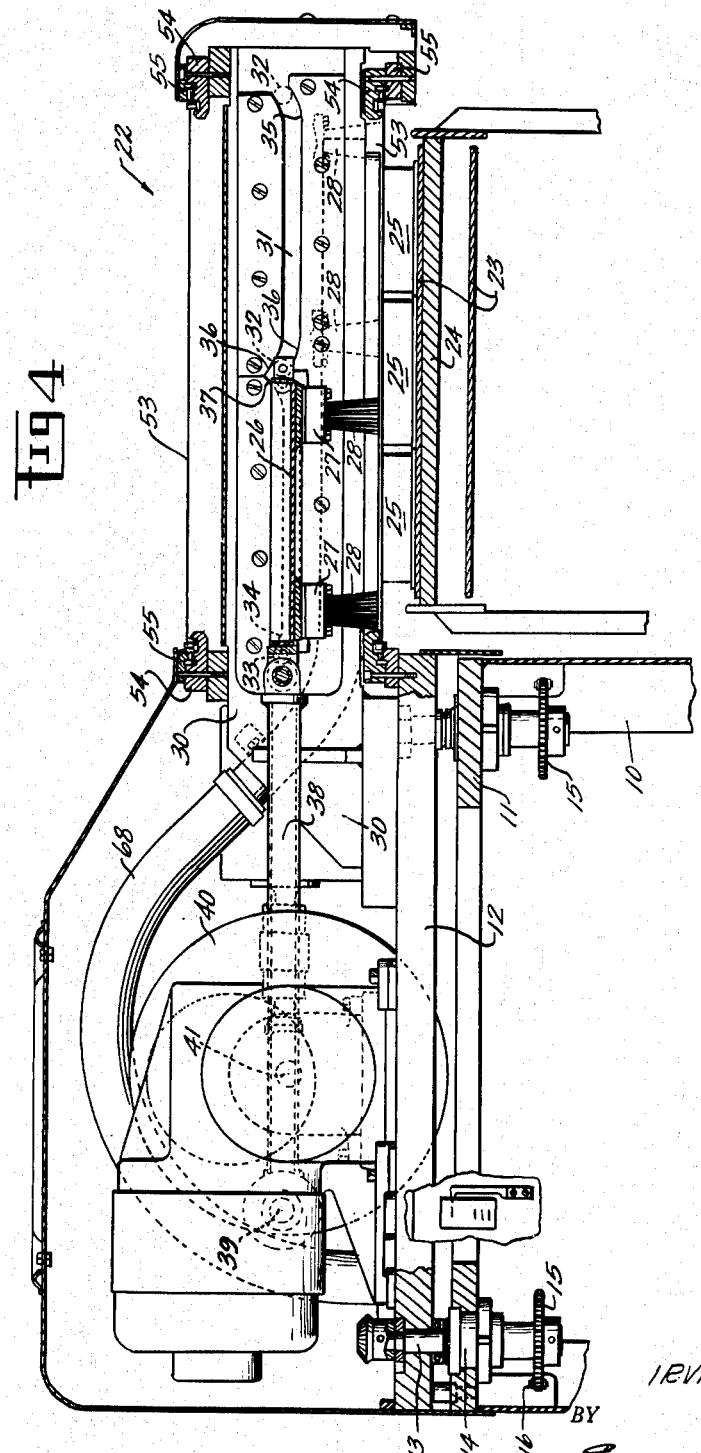

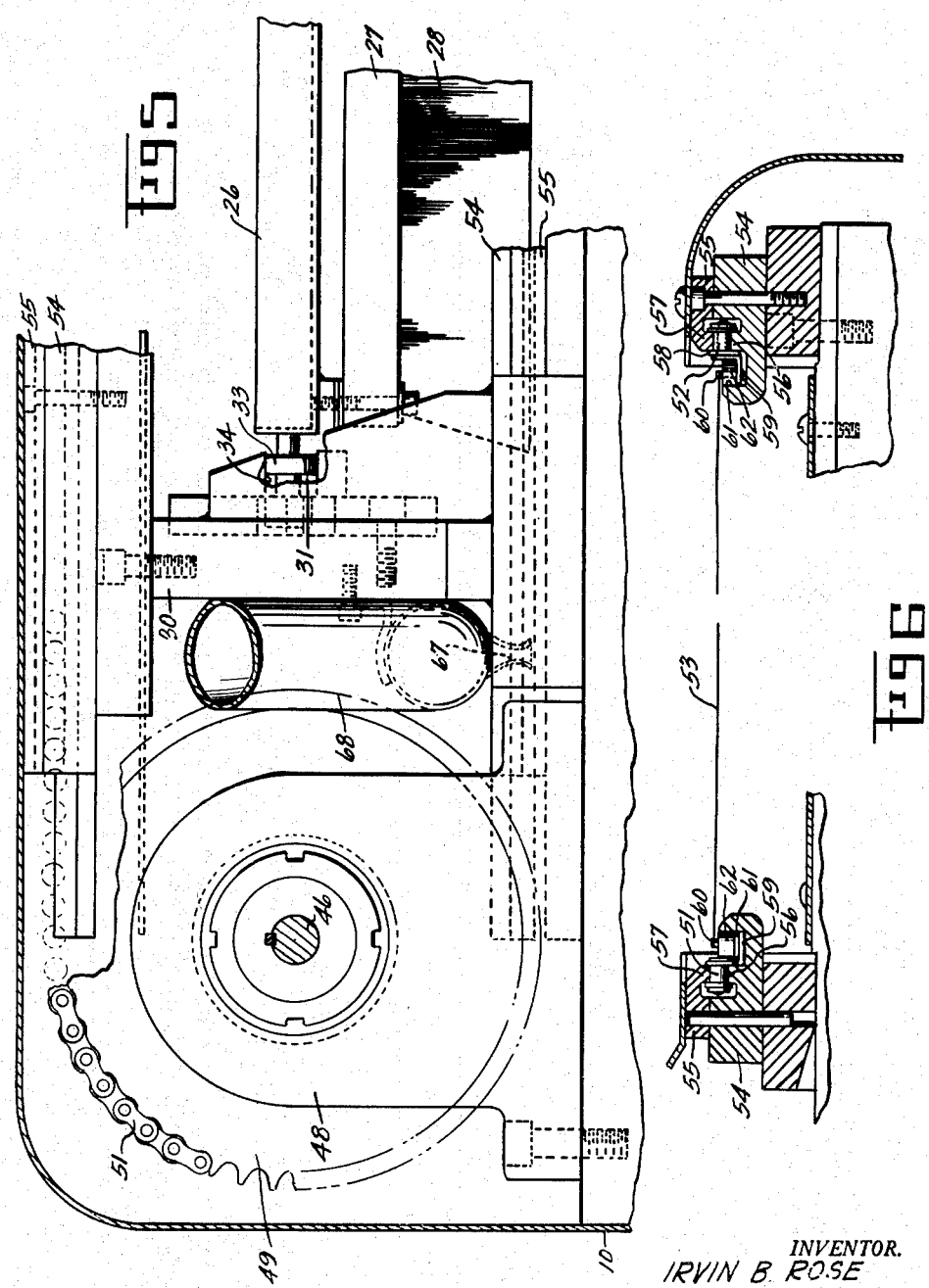

Patented Feb. 24, 1953

2,629,343

UNITED STATES PATENT OFFICE 2,629,343

BRUSHING MECHANISM

Irvin B. Rose, Dayton, Ohio, assignor, by mesne assignments, to Stephen F. Whitman & Son, Inc., Philadelphia, Pa., a corporation of Pennsylvania Application August 10, 1949, Serial No. 109,711

13 Claims. (Cl. 107—44)

This invention relates to a brushing mechanism and more particularly to a mechanism for brushing candy.

It is customary in the manufacture of high grade candy to brush the upper surfaces of the pieces of candy after they have been packed in boxes and before the tops have been placed on the boxes. Heretofore this brushing has been done by hand, usually by placing the open boxes on a conveyor and stationing girls along the conveyor to manually brush the candy as it moves past them. This is a slow and expensive method and is otherwise unsatisfactory.

One object of the invention is to provide a power operated mechanism which will brush the candy as it is moved by the conveyor, without marring the surfaces thereof or otherwise damaging the same.

A further object of the invention is to provide such a brushing mechanism with a brushing element which moves across the candy on the conveyor and the movement of which can be reversed at the end of each stroke thereof without injuring the candy.

A further object of the invention is to provide simple and effective means for preventing the displacement of the pieces of candy during the brushing operation.

The further object of the invention is to provide means for automatically removing fragments of candy, or other loose substances, from the boxes after the brushing operation has been completed.

Other objects of the invention may appear as the mechanism is described in detail.

In the accompanying drawings Fig. 1 is a perspective view of a brushing mechanism embodying the invention; Fig. 2 is the top plan view, partly in section, of one end portion of the mechanism; Fig. 3 is a similar view of the other end portion of the mechanism; Fig. 4 is a transverse section taken on the line 4—4 Fig. 2; Fig. 5 is a section taken on the line 5—5 on Fig. 3; and Fig. 6 is a section through the upper stretch of the retaining device, taken on the line 6—6 of Fig. 3 and partly broken away.

In these drawings I have illustrated a preferred embodiment of the invention and I have shown the same as designed for brushing candy, but it is to be understood that the mechanism as a whole, as well as the several parts thereof, may take various forms, and that it may be used for various purposes, without departing from the spirit of the invention.

The invention comprises a supporting structure on which is mounted a brushing unit adapted to be positioned above a conveyor and including a brushing element movable over and in contact with articles to be brushed, a movable retaining device arranged between the brushing element and the articles to be brushed to prevent the displacement of the latter, and means for removing fragments of candy, or the like, from the containers of the articles to be brushed.

In the particular embodiment here illustrated, the supporting structure is shown as a cabinet 10 having a top wall 11 on which is mounted an adjustable base. The brushing unit is supported on the base 12 and the base is made vertically adjustable to enable the brushing unit to be spaced from the conveyor a distance determined by the height of the articles to be brushed. In the present instance the base is rectangular in form and each corner portion thereof is supported on an adjusting screw 13 which is rotatably mounted in a bushing 14 mounted in the top wall 11. The screw 13 and the bushing 14 are provided with cooperating screw threads, not shown but of conventional form such that the rotation of the screws will impart vertical movement with the base 12. The adjusting screws may be actuated in any suitable manner but preferably they are actuated simultaneously to maintain the base 12 in a horizontal position. In the construction shown a sprocket wheel 15 is mounted on each screw, below the top wall 11, and a sprocket chain 16 extends about the several sprocket wheels. One of the screws is provided above the base with a bevel gear 17 with which meshes bevel pinion 18 rigidly secured to a short shaft 19 rotatably mounted in a bearing 20 and provided with a suitable operating handle 21.

The brushing unit, which is indicated as a whole by the reference numeral 22, is mounted on the base 12 and extends laterally therefrom so that it may be positioned above a movable support or conveyor for the articles to be brushed. This conveyor can be of any suitable character and in the present instance it is shown as an endless belt 23, preferably of fabric, the upper stretch of which moves over a table top 24 or other supporting surface which will maintain the upper stretch of the belt in a horizontal plane. The articles to be brushed are in the present instance pieces of candy which have been packed in boxes 25 and are of such height that the upper surfaces thereof are adjacent the horizontal plane of the upper edges of the boxes.

The brushing element, which forms a part of the brushing unit, may take various forms but it preferably moves transversely to the path or paths along which the articles to be brushed move. In the construction illustrated it comprises an elongate frame 26 which extends lengthwise of the supporting structure and is supported at its respective ends on guides extending transversely to the supporting structure and the conveyor. This frame carries one or more brush heads 27, in the present instance two, which extend lengthwise of the frame and are secured to the lower side of the frame adjacent the inner and outer edges thereof, and are thus spaced a substantial distance one from the other. The bristles 28 of the brush heads are of relatively soft, flexible material and are of such length that they engage and move in contact with the articles to be brushed as the frame 26 moves on the guides. The guides for the brushing element comprise transverse bars 29 and 30 which are rigidly mounted on the base 12 and extend laterally therefrom in parallel relation one to the other. Each of these bars is provided in its inner surface with a track or longitudinal channel 31 and the frame 26 of the brushing element is provided at each side thereof with rollers 32 and 33 which travel on the respective tracks, thus supporting the brushing element for reciprocatory movement transverse to the line of movement of the conveyor. As the brushing element moves in contact with the articles to be brushed the lower portions of the bristles 28 are deflected rearwardly so as to have a firm brushing action on the articles and when the brushing element reaches the end of its stroke in either direction these bristles must move to substantially vertical positions so that they can be deflected in the opposite direction by the reverse movement of the brushing element. If the bristles remained in engagement with the pieces of candy, or other fragile articles, this reversing of the direction of inclination thereof would damage the surfaces of the articles. Therefore, means are provided for moving the bristles out of engagement with the candy during the reversal of the direction of movement of the brushing element. For this purpose each of the tracks or channels 31 is provided at the inner end thereof with an upwardly inclined end portion 34, and at the outer end thereof of an upwardly inclined portion 35. Adjacent the center thereof each track 31 is provided with two upwardly converging portions 36 and 37. The rollers 32 and 33 on the brushing element are spaced apart such a distance that when the brushing element is moved to the inner limit of its movement, as shown in Fig. 4, the roller 32 will be on the inclined portion 34 of the track and the roller 32 will be on the inclined portion 36 of the track and thus the brushing element will be lifted so that the bristles 28 may move to substantially vertical positions above the plane of the upper surfaces of the articles to be brushed. When outward movement is imparted to the brushing element the rollers move onto the horizontal portions of the track thus lowering the bristles into an engagement with the articles to be brushed and moving the same across the articles until the roller 32 engages the inclined portion 35 and the roller 33 engages the inclined portion 37 thus again moving the bristles out of engagement with the articles. The reciprocatory movement may be imparted to the brushing element in any suitable manner and in the arrangement here shown the frame 26 is pivotally connected with one end of a pitman 38, the other end of which is mounted on a wrist pin 39 carried by a crank disk 40. The disk 40 is rigidly secured to one end of a shaft 41 mounted in a bearing 42 on the base 12 and is drivingly connected with an electric motor 43, through speed reducing mechanism contained in a case 44.

To prevent the displacement of the articles being brushed there is provided a movable retaining device having spaced members to engage the articles to be brushed and to remain in engagement therewith as the articles move past the brushing mechanism. This retaining device may take various forms but preferably it comprises an endless structure having transverse members to engage the articles as the lower stretch of the endless structure moves over the same. In the construction here illustrated two parallel shafts 45 and 46 are mounted respectively in bearings 47 and 48 on the base 12 and extend laterally from that base above the conveyor 23, and in the present instance extend slightly beyond the outer side of the conveyor. Sprocket wheels 49 are secured to the respective shafts adjacent the bearings thereof and other sprocket wheels 50 are secured to the respective shafts adjacent the outer ends thereof. Sprocket chains 51 and 52 extend about the corresponding sprocket wheels 49 and 50. Extending between the two sprocket chains and connected therewith is an endless series of small diameter strands 53 of flexible material which are adapted to engage the articles to be brushed as the lower stretch of said endless series moves over the conveyor. The strands may be of any suitable material, but in brushing candy and the like it is desirable that they should be maintained taut and should have some elasticity. Nylon thread has been found very satisfactory for this purpose. The strands are spaced one from the other distances determined in part by the size of the articles to be brushed and such that each article will be engaged by at least one strand as it moves beneath the brushing elements. The strands, of course, extend transversely to the line of movement of the conveyor and substantially parallel to the line of movement of the brushing element and the brushing element acts on the articles between the strands and may slightly displace the strands without moving the same out of engagement with the articles, so as to brush all of the upper surface of each article.

The sprocket chains 51 and 52 move in engagement with fixed upper and lower longitudinal guides, each of these guides comprising two members 54 and 55 having opposed narrow track portions 56 and 57 between which one stretch of the corresponding sprocket chain moves. These tracks are spaced apart just far enough to receive the pivot pins which connect the chain links and to permit the free movement thereof. The links themselves, as shown at 58, are of a width greater than the space between the track members and extend across the lateral surfaces of the track members to prevent material lateral displacement of the sprocket chain. The strands 53 may be connected with the sprocket chains in any suitable manner. As above stated the strands are spaced one from the other a distance suitable for the particular articles which are to be brushed and in the present instance they are spaced one from the other approximately one-half inch. Each strand is connected at its ends with opposed pivot pins of the two sprocket chains and in the present instance an angular bracket 59 is mounted on each pivot pin of each chain and a stud 60 extends upwardly from that bracket, and the strands are connected with the studs. The studs are positively guided in their movement so as to maintain the strands taut, and in the present instance each bracket moves in a channel 61 in the corresponding guide member 54 and a roller 62 mounted on the stud engages the side wall of the channel. Any suitable means may be provided for actuating the retaining device and as here shown, the shaft 46 is connected with an electric motor 63 through the speed reducing gearing contained in a casing 64.

During the packing of the candy in the boxes and during the brushing thereof fragments of candy are frequently loosened and drop into the boxes. It is desirable that these fragments be removed from the boxes and I have provided a suction device which will remove fragments from the boxes after the latter has passed the brushing element. In the construction here shown, a suction nozzle 65 is mounted between the brushing element and the rear shaft 46, and above the lower stretch of the retaining device, the nozzle as here shown is mounted on the guide bar 30 for the brushing element, as by brackets 66, and is provided with a downwardly facing intake opening 67 which is arranged just above the path of the retaining strands. This nozzle is closed at its outer end and is connected at its inner end with a conduit 68 which extends into cabinet 10 and is there connected with suitable means for producing suction in the nozzle, such as an exhaust fan, which may be of a conventional construction and is not shown. Thus when the candy boxes are discharged from the delivery end of the conveyor the individual pieces of candy all have been brushed and fragments or other loose substances which may be in the boxes have been withdrawn and the boxes are ready to receive tops or closures therefore and for shipment.

While I have shown and described one embodiment of my invention, I wish it to be understood that I do not desire to be limited to the details thereof as various modifications may occur to a person skilled in the art.

I claim:

1. In a brushing mechanism, a supporting structure, a movable brushing element supported by said structure and adapted to be positioned above a conveyor for articles to be brushed, means for moving said brushing element in brushing contact with articles on said conveyor, a retaining device having a part movable below and adjacent to the path of movement of said brushing element and in the direction of movement of said articles to engage the latter and prevent the displacement thereof by said brushing element, and means for actuating said retaining device.

2. In a brushing mechanism, a supporting structure, a movable brushing element supported by said structure and adapted to be positioned above a conveyor for articles to be brushed, means for moving said brushing element in brushing contact with articles on said conveyor, an endless retaining device having its lower stretch movable in a substantially horizontal plane below and adjacent to said brushing element to engage the articles to be brushed and prevent the displacement thereof, and means for actuating said retaining device.

3. In a brushing mechanism, a supporting structure, a movable brushing element supported by said structure and adapted to be positioned above a conveyor for articles to be brushed, means for moving said brushing element in brushing contact with articles on said conveyor, an endless retaining device movable about spaced and substantially horizontal axes and including a series of strands of yieldable material extending transversely to the path of movement thereof and spaced relatively short distances one from the other, the lower stretch of said retaining device extending below said brushing element to engage articles to be brushed, and means for actuating said device.

4. A brushing mechanism comprising in combination with an endless conveyor for articles to be brushed, a supporting structure, a movable brushing element supported by said structure above said conveyor, means for reciprocating said brushing element in a path transverse to the line of movement of said conveyor and in brushing contact with articles thereon, a device supported between said brushing element and said conveyor to retain said articles against movement on said conveyor, said device being movable in a path transverse to the path of said brushing element, and means for actuating said retaining device.

5. In a brushing mechanism, a supporting structure, a movable brushing element supported by said structure and adapted to be positioned above a conveyor for articles to be brushed, means for reciprocating said brushing element in a path transverse to the path of the articles to be brushed, an endless retaining device having transverse article engaging parts spaced one from the other in the direction of movement of said device. the lower stretch of said retaining device extending below and adjacent to said brushing element, and means for actuating said retaining device.

6. In a brushing mechanism, a supporting structure, a brushing unit supported by said structure, extending beyond one side thereof and adapted to be positioned above a conveyor for articles to be brushed, said unit comprising a retaining device including a series of substantially parallel strands of yieldable material spaced relatively short distances one from the other and adapted to engage articles to be brushed, and a brushing element movable in contact with said articles to be brushed and in the direction of the length of said strands, and means for actuating said brushing element.

7. In a brushing mechanism, a supporting structure, a brushing unit supported by said structure, extending beyond one side thereof and adapted to be positioned above a conveyor for articles to be brushed. said unit comprising an endless retaining device movable about substantially horizontal axes spaced one from the other and including a series of strands of flexible material extending transversely to the path of said device and spaced relatively short distances one from the other, the lower stretch of said device being arranged to engage articles to be brushed, and a brushing element supported between the upper and lower stretches of said device to engage said articles between said strands, and means for reciprocating said brushing element in the direction of the length of said strands and means for actuating said retaining device.

8. In a brushing mechanism, a supporting structure, a brushing unit supported by said structure, extending beyond one side thereof and adapted to be positioned above a conveyor for articles to be brushed, said unit comprising an endless retaining device movable about substantial horizontal axes spaced one from the other and including a series of strands of flexible material extending transversely to the path of said device and spaced relatively short distances one from the other, the lower stretch of said device being arranged to engage articles to be brushed, and a brushing element including a frame supported above said lower stretch of said endless device and a brush carried by said frame and extending transversely to said strands, means for reciprocating said brushing element in the direction of the length of said strands to move said brush in contact with the articles to be brushed, and means for actuating said retaining device.

9. In a mechanism for brushing articles on a moving conveyor, a brushing element extending lengthwise of said conveyor, means for supporting said brushing element for reciprocatory movement transversely to said conveyor and in contact with said articles, fixed guides at the respective ends of said element, said element having at each end thereof spaced parts movable on the adjacent guide, and each guide having upwardly inclined portions adjacent the respective ends thereof and upwardly converging portions adjacent the center thereof, said portions of said guides being so arranged that said parts of said element will engage inclined portions of said guides as said element approaches each end of its stroke and will lift said element out of engagement with said articles.

10. In a brushing mechanism, a supporting structure, a brushing unit supported by said structure, extending beyond one side thereof and adapted to be positioned above a conveyor for articles to be brushed, said unit comprising a retaining device including a series of substantially parallel strands of yieldable material spaced relatively short distances one from the other and adapted to engage articles to be brushed, and a brushing element movable in contact with said articles to be brushed and in the direction of the length of said strands, means for actuating said brushing element, a suction nozzle supported above a portion of said retaining device portion beyond said brushing element and having an inlet adjacent said retaining device, and means for creating suction in said nozzle.

11. In a mechanism for brushing articles on a moving conveyor, a supporting structure, two parallel shafts rotatably supported on said structure and extending laterally beyond the same, sprocket wheels on each shaft, sprocket chains extending about corresponding sprocket wheels on the respective shafts, a series of taut flexible strands each connected at its ends with the respective chains, means on said structure for rotating one of said shafts, guides for said chains carried by fixed parts of said structure and each comprising parts extending lengthwise of the respective chains above and below the strands on the lower stretches of said chains, a brushing element extending lengthwise of said chains above said lower strands for brushing engagement with articles below said strands, and means on said structure for imparting reciprocatory movement to said brushing element.

12. In a mechanism for brushing articles on a moving conveyor, a supporting structure, two parallel shafts rotatably supported on said structure and extending laterally beyond the same, sprocket wheels on each shaft, sprocket chains extending about corresponding sprocket wheels on the respective shafts, a series of taut elastic strands, each connected at its ends with the respective chains, means on said structure for rotating one of said shafts, a brushing element extending lengthwise of said chains above the strands on the lower stretches on said chains, and means carried by said structure for reciprocating said brushing element in the direction of the length of said strands in brushing engagement with articles below said strands and for moving said brushing element out of engagement with said articles at the end of each stroke thereof.

13. In a mechanism for brushing articles on a moving conveyor, a supporting structure, two parallel shafts rotatably supported on said structure and extending laterally beyond the same, sprocket wheels on each shaft, sprocket chains extending about corresponding sprocket wheels on the respective shafts, a series of taut elastic strands, each connected at its ends with respective chains, means on said structure for rotating one of said shafts, a brushing element extending lengthwise of said chains above the strands on the lower stretches of said chains, means carried by said structure for reciprocating said brushing element in the direction of the length of said strands in brushing engagement with articles below said strands and means for moving said brushing element out of engagement with said articles at the end of each stroke thereof, a suction nozzle supported above said lower strands adjacent one of said shafts and having a downwardly facing inlet, and means on said structure for creating suction in said nozzle.

IRVIN B. ROSE.

REFERENCES CITED

The following references are of record in the file of this patent:

UNITED STATES PATENTS

| Number | Name | Date |
|---|---|---|
| 687,542 | Paehlke | Nov. 26, 1901 |
| 809,182 | Haase | Jan. 2, 1906 |
| 999,488 | Drexler et al. | Aug. 1, 1911 |
| 1,275,365 | Bausman | Aug. 13, 1918 |
| 1,301,006 | Prior | Apr. 15, 1919 |
| 1,416,196 | Hansen | May 16, 1922 |
| 1,529,753 | Stachowski | Mar. 17, 1925 |
| 1,542,347 | McCullough | June 16, 1925 |
| 2,018,418 | Rapisarda | Oct. 22, 1935 |
| 2,183,033 | Segrin | Dec. 12, 1939 |

FOREIGN PATENTS

| Number | Country | Date |
|---|---|---|
| 335,773 | France | Dec. 15, 1903 |
| 539,527 | France | Apr. 4, 1922 |